(12) United States Patent
Netzer

(10) Patent No.: US 10,518,873 B2
(45) Date of Patent: Dec. 31, 2019

(54) CONVERTIBLE ROTOR AIRCRAFT

(71) Applicant: Yoav Netzer, Moers (DE)

(72) Inventor: Yoav Netzer, Moers (DE)

(73) Assignee: Yoav Netzer, Moers (DE)

( * ) Notice: Subject to any disclaimer, the term of this patent is extended or adjusted under 35 U.S.C. 154(b) by 0 days.

(21) Appl. No.: 15/737,324

(22) PCT Filed: Mar. 10, 2016

(86) PCT No.: PCT/IB2016/051353
§ 371 (c)(1),
(2) Date: Dec. 18, 2017

(87) PCT Pub. No.: WO2017/153807
PCT Pub. Date: Sep. 14, 2017

(65) Prior Publication Data
US 2018/0370625 A1 Dec. 27, 2018

(51) Int. Cl.
B64C 27/28 (2006.01)
B64C 27/08 (2006.01)
(Continued)

(52) U.S. Cl.
CPC ............. B64C 27/28 (2013.01); B64C 27/08 (2013.01); B64C 27/26 (2013.01); B64C 27/50 (2013.01);
(Continued)

(58) Field of Classification Search
CPC ......... B64C 27/08; B64C 27/28; B64C 27/50; B64C 29/0033; B64C 29/0083
See application file for complete search history.

(56) References Cited

U.S. PATENT DOCUMENTS 2,130,918 A    9/1938  De Stefano
2,521,012 A *  9/1950  Kay .................... B64C 27/08
                                                244/17.11
(Continued)

FOREIGN PATENT DOCUMENTS

EP    1382527    1/2004
ES    2277476    7/2007
(Continued)

OTHER PUBLICATIONS

International Search Report and Written Opinion dated Jul. 14, 2016 issued in the corresponding International PCT Application serial No. PCT/IB2016/051353 filed Mar. 10, 2016.
(Continued)

Primary Examiner — Richard R. Green
Assistant Examiner — Michael B. Kreiner
(74) Attorney, Agent, or Firm — A.C. Entis-IP Ltd.; Allan C. Entis; Kenichi N Hartman

(57) ABSTRACT

A convertible rotor aircraft (CRA) able to convert between airplane and helicopter flight modes during flight, comprising: at least one tillable proprotor assembly (TPA) comprising a proprotor that is tiltable to change the axis of rotation of the proprotor between a substantially horizontal airplane mode and a substantially vertical helicopter mode; and a main rotor system for providing lift during helicopter mode comprising at least one rotor, which produces airflow that flows through at least a portion the proprotor blades of the at least one TPA.

16 Claims, 8 Drawing Sheets

(51) Int. Cl.
*B64C 27/26* (2006.01)
*B64C 27/50* (2006.01)
*B64C 29/00* (2006.01)
*B64C 37/00* (2006.01)
*B64C 39/12* (2006.01)

(52) U.S. Cl.
CPC ...... *B64C 29/0025* (2013.01); *B64C 29/0033* (2013.01); *B64C 37/00* (2013.01); *B64C 39/12* (2013.01)

(56) References Cited

U.S. PATENT DOCUMENTS

| | | | | |
|---|---|---|---|---|
| 2,623,597 | A | * | 12/1952 | Miller, Jr. ............... B64C 27/08 416/122 |
| 2,646,130 | A | * | 7/1953 | Udelman ................ B64C 27/08 416/110 |
| 3,035,789 | A | | 5/1962 | Young |
| 3,065,934 | A | * | 11/1962 | Jackson ................... B64D 1/22 244/137.1 |
| 3,370,809 | A | * | 2/1968 | Leoni ..................... B64C 27/26 244/7 R |
| 3,409,248 | A | * | 11/1968 | Bryan ................. B64C 29/0025 244/17.25 |
| 3,426,982 | A | | 2/1969 | Markwood |
| 3,428,271 | A | | 2/1969 | Hollrock et al. |
| 3,488,018 | A | * | 1/1970 | Johnson .............. B64C 29/0033 244/12.4 |
| 3,514,051 | A | | 5/1970 | Celayan |
| 3,586,262 | A | | 6/1971 | Sherman |
| 4,874,291 | A | * | 10/1989 | Roberts ................... B64C 27/08 416/122 |
| 4,979,698 | A | * | 12/1990 | Lederman ........... B64C 29/0033 244/17.13 |
| 5,085,315 | A | | 2/1992 | Sambell |
| 6,234,422 | B1 | * | 5/2001 | Bolonkin .............. B64C 27/026 244/17.11 |
| 6,467,726 | B1 | * | 10/2002 | Hosoda ................... B64C 27/14 180/337 |
| 7,584,923 | B2 | * | 9/2009 | Burrage .............. B64C 29/0033 244/17.23 |
| 7,959,104 | B2 | * | 6/2011 | Kuntz .................... A63H 17/00 244/2 |
| 8,128,034 | B2 | * | 3/2012 | Karem ................... B64C 27/08 244/17.23 |
| 8,376,264 | B1 | * | 2/2013 | Hong ..................... B64C 27/26 244/17.23 |
| 8,950,698 | B1 | * | 2/2015 | Rossi ..................... B64C 37/02 244/2 |
| 9,187,174 | B2 | * | 11/2015 | Shaw ..................... B64C 27/28 |
| 9,702,254 | B2 | * | 7/2017 | Saiz ...................... B64C 27/26 |
| 9,944,387 | B2 | * | 4/2018 | Vander Lind ........... B64C 27/26 |
| 2002/0104922 | A1 | * | 8/2002 | Nakamura ............. B64C 27/08 244/17.25 |
| 2002/0125367 | A1 | * | 9/2002 | Killingsworth .......... B60F 3/00 244/17.11 |
| 2002/0195518 | A1 | * | 12/2002 | Killingsworth .......... B60F 3/00 244/7 A |
| 2005/0230519 | A1 | * | 10/2005 | Hurley ................ B64C 29/0033 244/7 C |
| 2010/0072325 | A1 | | 3/2010 | Sambell |
| 2010/0243821 | A1 | * | 9/2010 | Lim ....................... B64C 27/08 244/7 A |
| 2013/0105620 | A1 | | 5/2013 | Abde Qader Alzu'bi et al. |
| 2013/0173091 | A1 | | 7/2013 | Abildgaard et al. |
| 2014/0084114 | A1 | | 3/2014 | Valentin |
| 2016/0031556 | A1 | | 2/2016 | Bevirt et al. |
| 2017/0253326 | A1 | * | 9/2017 | Mullins ................... B64C 27/14 |

FOREIGN PATENT DOCUMENTS

| | | | | |
|---|---|---|---|---|
| FR | 2644134 | A1 | * 9/1990 | ............ B64C 17/02 |
| GB | 1075769 | A | * 7/1967 | ............ B64C 27/08 |
| GB | 1322169 | | 7/1973 | |
| WO | 2015101346 | | 7/2015 | |

OTHER PUBLICATIONS

International Preliminary Report on Patentability dated Jul. 11, 2017 issued in the corresponding International PCT Application serial No. PCT/IB2016/051353 filed Mar. 10, 2016.
European Supplementary Search Report dated May 7, 2018 for corresponding application No. 16893358.8 filed Dec. 20, 2017.
European Office Action dated May 31, 2018 for corresponding application No. 16893358.8 filed Dec. 20, 2017.
European Office Action dated Oct. 25, 2018 for application No. 16893358.8 filed Dec. 20, 2017.
Canadian Office Action dated Nov. 22, 2018 for application No. 3015861 filed Sep. 7, 2018.
Partial Supplementary European Search Report dated Feb. 20, 2018 for corresponding application No. 16893358.8 filed Dec. 20, 2017.
Russian Office Action dated Apr. 2, 2019 for Application No. 2018135252 filed Oct. 6, 2018.

* cited by examiner

CONVERTIBLE ROTOR AIRCRAFT

RELATED APPLICATIONS

The present application is a U.S. National Phase of PCT Application No. PCT/IB2016/051353, filed on Mar. 10, 2016, the disclosure of which is incorporated herein by reference.

TECHNICAL FIELD

Embodiments of the disclosure relate to a convertible rotor aircraft (CRA) able to convert between airplane and helicopter flight modes during flight or on the ground.

BACKGROUND

There has been longstanding interest in developing CRAs that combine the VTOL (vertical takeoff and landing) and hovering capabilities of a helicopter with the long range, high velocity forward flight capabilities of an airplane. CRAs typically comprise at least one tiltable proprotor assembly (TPA) comprising a proprotor driven by a rotating engine pod (REP) that is tiltable to change the axis of rotation of the proprotor between an airplane mode for providing high velocity forward flight and a helicopter mode for providing vertical flight and/or VTOL. A proprotor is a spinning airfoil that may be used as both an airplane-style propeller and a helicopter-style rotor during the same flight. A blade of a rotor, which is used for hovering and vertical flight, is typically longer and more flexible than a blade for a propeller, which is used for forward flight. A proprotor is typically characterized by a blade length and a blade flexibility that are between a propeller and a rotor. During the helicopter mode, the TPA is tilted such that the axis of rotation of the proprotor(s) is substantially parallel to the vertical axis of the CRA (herein "vertical") to provide the CRA with lift. During the airplane mode, the TPA is tilted such that the proprotor rotation axis is substantially parallel to the longitudinal axis of the CRA (hereinafter "horizontal") in order to pull and/or push the aircraft forward.

SUMMARY

An aspect of an embodiment of the disclosure relates to providing a CRA having relatively efficient horizontal, forward flight while maintaining vertical flight advantages.

In accordance with an embodiment of the disclosure, the CRA comprises a main rotor system for providing lift for vertical take-off and landing (VTOL) during helicopter mode, the main rotor system comprising at least one rotor mounted to a mast rotated by a suitable aircraft engine mounted to the CRA's fuselage, at least one TPA comprising a proprotor driven by a REP that is tiltable to change the axis of rotation of the proprotor between an airplane mode and a helicopter mode, and wings for providing lift during forward flight. In accordance with an embodiment of the disclosure, the main rotor system and the at least one PTA are arranged such that, in helicopter mode, a portion of downward induced airflow from the main rotor blades flows through at least a portion of the blades of the at least one proprotor. In accordance with an embodiment of the disclosure, a portion of a disc defined by the rotating main rotor blades ("main rotor disc") overhangs at least a portion of a disc defined by the rotating proprotor blades ("proprotor disc") of the at least one TPA. Alternatively or additionally, the at least one main rotor and the proprotor blades are configured such that, in helicopter mode, downwash produced by the at least one main rotor flows through the proprotor disc. The one or more TPA(s) are optionally configured along a longitudinal axis of the CRA. The TPA is optionally pivotably mounted on a forward boom or a tail boom. Optionally, the CRA comprises two TPAs that are pivotably mounted on the forward boom and the tail boom, respectively. When in helicopter or intermediate mode, the front and rear TPAs may be controlled to provide substantially equal thrust between them in order to keep the CRA balanced around its pitch axis, or alternatively controlled to provide unequal thrust between them in order to change the orientation of the CRA around its pitch axis. The CRA may be configured to be capable of conventional (non-VTOL) take-off and landing when in airplane mode.

The main rotor system optionally comprises a synchropter system comprising two intermeshing rotors turning in opposite directions, with each rotor mast mounted with the axis of the blades at an angle relative to the other in a manner so that the intermeshing blades do not collide with each other. In a synchropter configuration, the counter-rotating rotors of the main rotor system serve to stabilize the CRA's yaw. Where the main rotor system comprises a single rotor, the CRA contains a yaw control mechanism, by way of example coanda-effect pipes in the tail.

In an embodiment of the disclosure, the main rotor may be pivotable such that the main rotor may transition between: (1) a deployed state where the main rotor is functional to provide lift; and (2) a folded state in which the main rotor blades are positioned along a CRA body to reduce drag and facilitate forward flight. In an embodiment of the disclosure, the arrangement of the rotor hub with the mast is fixed and unchanged during the transition between the deployed and folded states. Optionally, a side surface of the main rotor is apposed to the CRA body during the folded state. Optionally, a longitudinal axis of a mast of the main rotor in the folded state is substantially parallel to a lateral axis of the CRA. Optionally, the main rotor blades may be positioned during the folded state so that the longitudinal axis of each blade, when viewed from above, is substantially parallel to the longitudinal axis of the CRA. Optionally, the main rotor blades may be positioned during the folded state so that a major surface of the rotor blades rests along the forward boom. Where the main rotor system is a synchropter system having two main rotors that are arranged to be on opposite sides of, and optionally equidistant from, a longitudinal axis of the CRA, the main rotors may be pivoted towards the longitudinal axis of the CRA, towards each other. The two main rotors may be intermeshed when in the deployed state in order to be able to rotate and produce lift without striking each other in the synchropter configuration. In the folded state, the rotors may be unmeshed to allow the longitudinal axis of each blade to be, by way of example, substantially parallel to the longitudinal axis of the CRA.

In accordance with an embodiment of the disclosure, a TPA (hereinafter referred to as a "dual mode TPA" or "DMTPA") may comprise two proprotors, an upstream proprotor and a downstream proprotor. Both the upstream and downstream proprotors are configured to generate airflow in the same direction. The two proprotors are configured relative to each other so that airflow generated by the upstream proprotor traverses the downstream proprotor, but the airflow generated by the downstream proprotor is directed substantially away from the upstream proprotor. In accordance with an embodiment of the disclosure, the downstream proprotor is configured to be more advantageous, relatively to the upstream proprotor, to function as a rotor to provide lift for hovering and/or VTOL, and the upstream proprotor is configured to be more advantageous, relative to the downstream proprotor, to function as a propeller to provide thrust for forward flight. Blades of the DMPTA downstream proprotor may differ from blades of the upstream proprotor in having one or a combination of two or more of: a higher structural flexibility, a longer length, and a thinner profile. The upstream and downstream proprotors of a DMTPA may be arranged in a coaxial formation.

A fore TPA, and optionally the forward boom that supports the fore TPA, may obscure the forward field of view (FOV) of a CRA's pilot. In accordance with an embodiment of the disclosure the CRA is fitted with an array of forward looking cameras that acquire images of a scene facing the CRA. The cameras provide the images to a head-mounted display (HMD) worn by the pilot and/or to a video screen in the CRA cockpit in order to provide the pilot with a substantially un-obscured forward FOV from the aircraft.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

Figure 1:
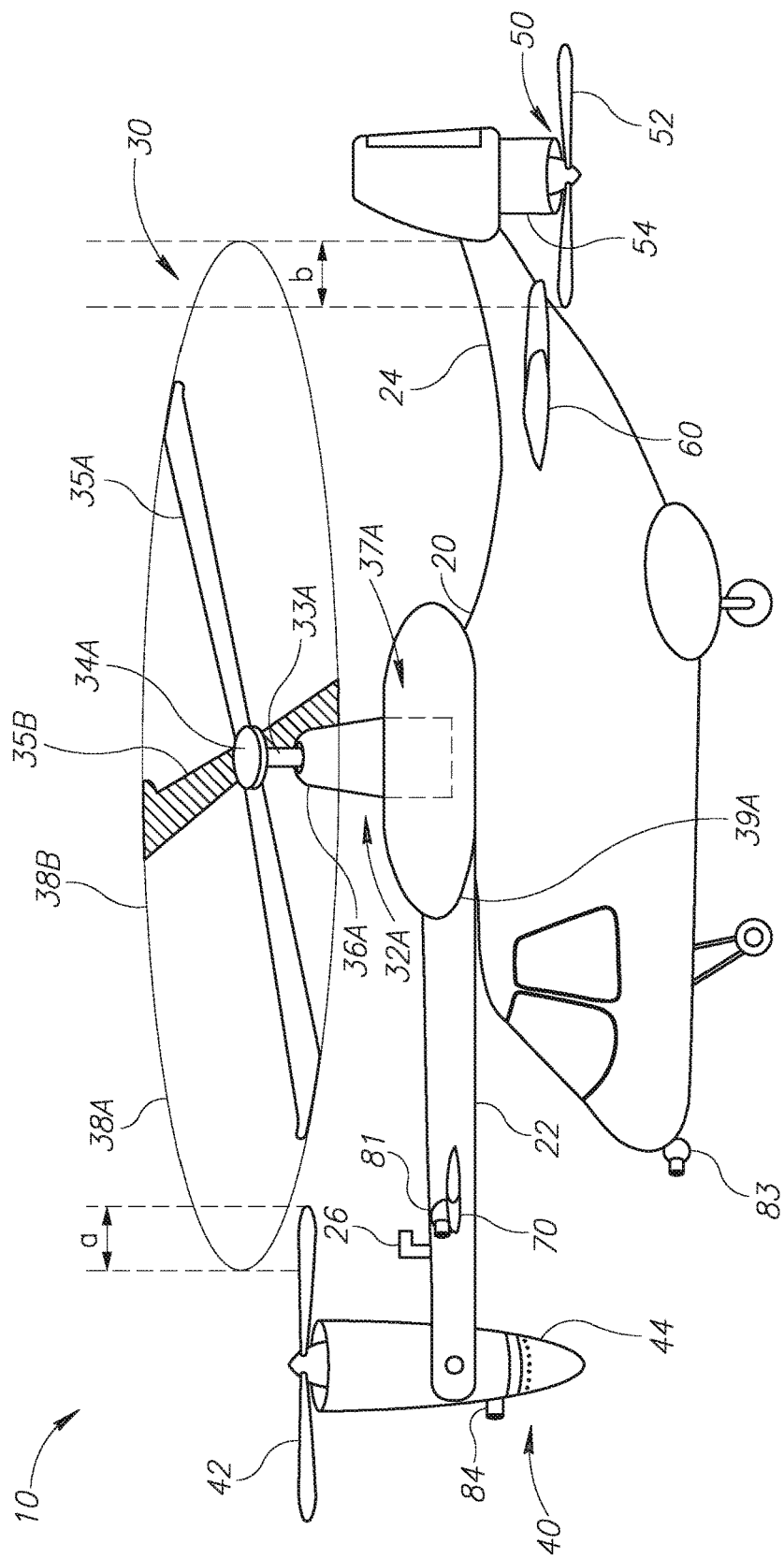
FIG. 1 shows a schematic illustration of a CRA in helicopter mode in accordance with an embodiment of the disclosure.
Figure 2A:
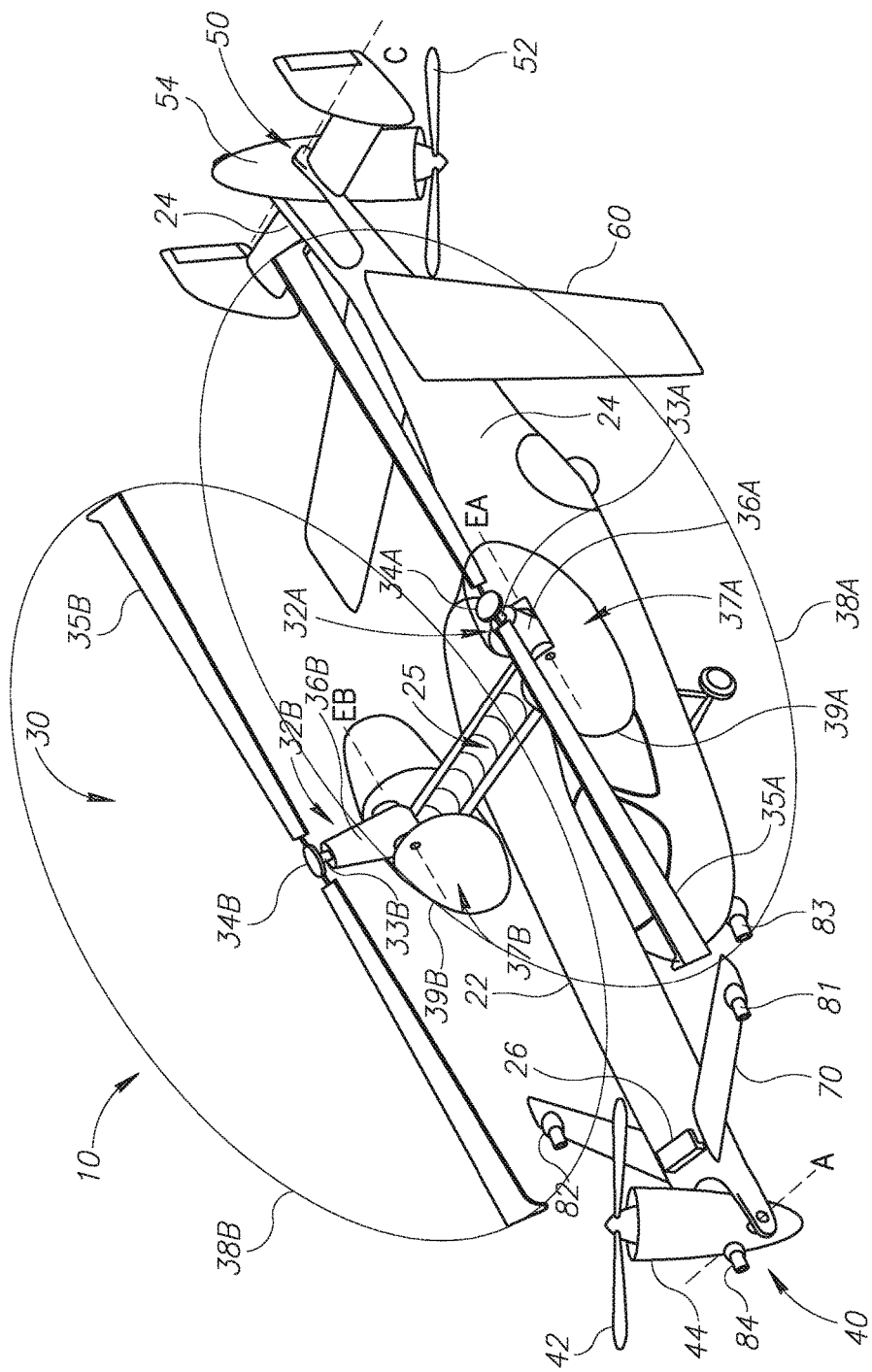
FIG. 2A shows a schematic illustration of a CRA in helicopter mode in accordance with an embodiment of the disclosure.
Figure 2B:
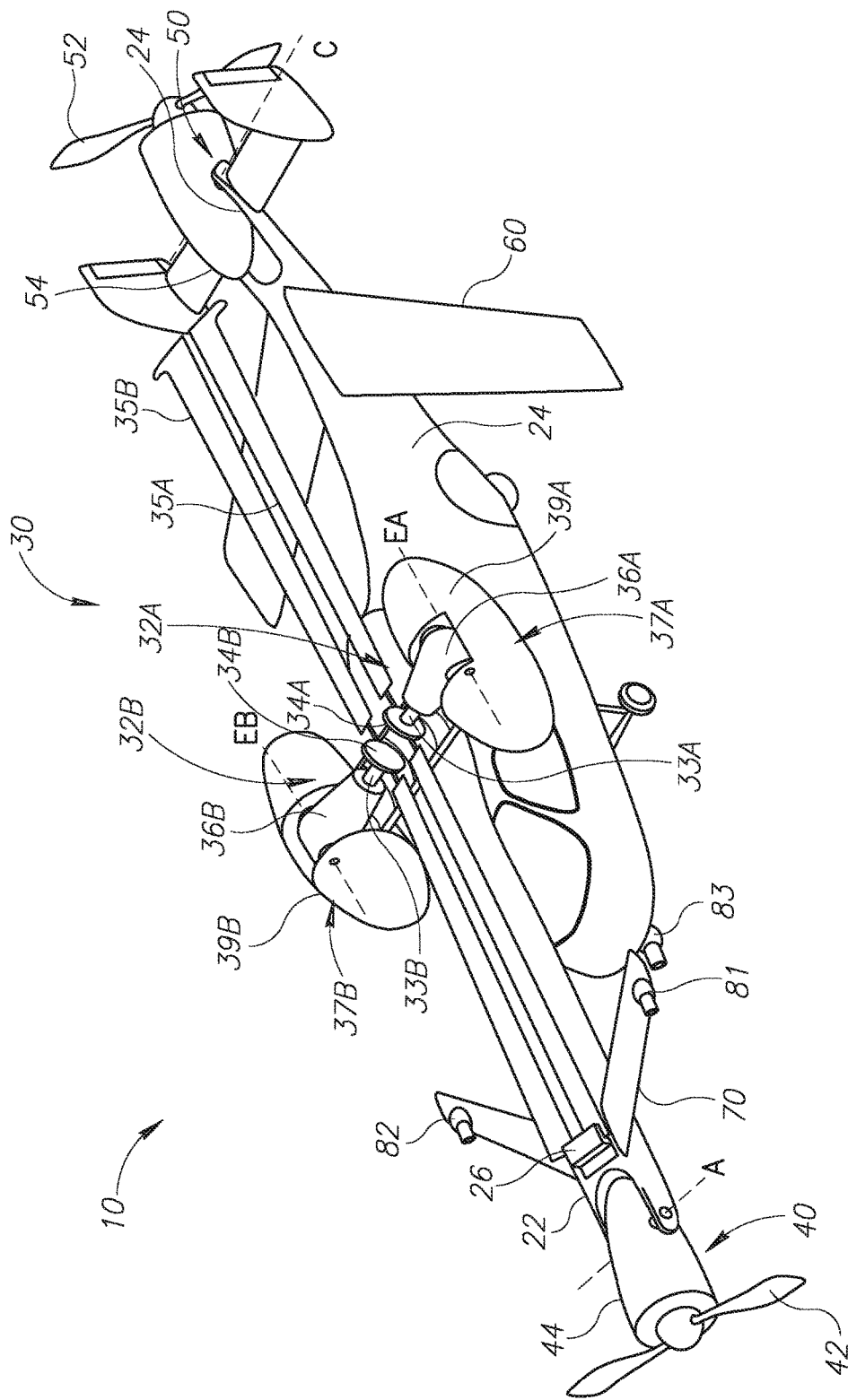
FIG. 2B shows a schematic illustration of a CRA in airplane mode in accordance with an embodiment of the disclosure.

FIGS. 1, 2A and 2B schematically illustrates a CRA 10 comprising a fuselage 20, a main rotor system 30 attached above fuselage 20 for providing lift, a fore TPA 40 connected to fuselage 20 with a forward boom 22, and a rear TPA 50 connected to fuselage 20 at tail boom 24. For convenience of presentation, any one or combination of fuselage 20, forward boom 22, and/or rear boom 24 may be referred to as a "CRA body". TPAs 40, 50 and main rotor system 30 are configured along a longitudinal axis of the CRA. CRA 10 comprises main wings 60 and optionally supplemental wings 70 for providing lift during forward flight in airplane mode.

FIGS. 1 and 2A show CRA 10 in helicopter mode and FIG. 2B shows the CRA in airplane mode. Each TPA is pivotably mounted and comprises an actuator (not shown) to independently rotate each TPA for transitioning between a helicopter mode where the axis of rotation of the proprotors is substantially vertical (FIGS. 1, 2A) for providing lift and an airplane mode where the axis of rotation of the proprotors is substantially horizontal (FIG. 2B) for providing forward thrust. Fore TPA 40 comprising a proprotor 42 driven by a REP 44 is pivotably mounted to fore boom 22. Fore TPA 40 comprises an actuator (not shown) that is used to rotate the fore TPA about axis A. Rear TPA 50 comprising a proprotor 52 driven by a REP 54 is pivotably mounted to fore boom 24. Rear TPA 50 comprises an actuator (not shown) that is used to rotate the fore TPA about axis C.

In the helicopter mode (FIGS. 1 and 2A), fore TPA 40 is pointed upwards and rear TPA 50 is pointed downwards. Rotation direction of proprotors 42, 52 are arranged so that they produce substantially uniform thrust in opposing directions, such that fore TPA 40 functions as a pulling proprotor that produces thrust in the direction to which it is pointed and rear TPA 50 functions as a pushing proprotor that produces thrust opposite the direction to which it is pointed. As a result, when fore TPA 40 is pointed up and rear TPA 50 is pointed down in helicopter mode, both TPAs produce lift. In airplane mode (FIG. 2B), proprotor 42 is pointed forward and proprotor 52 is pointed backwards, so that both TPAs forward thrust. The structure and operation of the fore and rear TPAs 40, 50, for example the pitch of proprotor blades, proprotor rotation speeds, may be configured to that torque applied to CRA 10 by fore proprotor 42 is substantially cancelled out by the torque applied to the CRA by rear proprotor 52. The configuration of TPA 40, 50 as described hereinabove, with fore proprotor 42 being a pulling proprotor and rear proprotor 52 being a pushing proprotor, provides an advantageous property whereby both TPAs 40, 50 are able to smoothly, and in a coordinated fashion, transition from: (1) helicopter mode with both TPAs producing lifting thrust; to (2) an intermediate TPA orientation between vertical and horizontal producing a combination of lifting thrust and forward thrust; to (3) airplane mode producing forward thrust, without requiring an inversion of proprotor rotation direction and/or blade pitch during the transition.

Main rotor system 30 comprises twin rotors 32A and 32B in a synchropter configuration, on opposite sides of, and optionally equidistant from, the longitudinal axis of the CRA. Rotor 32A comprises mast 33A, hub 34A blades 35A and housing 36A, and rotor 32B comprises mast 33B, hub 34B, blades 35B and housing 36B. Each rotor may comprise a swash plate assembly (not shown) and control rods (not shown) for controlling blade pitch to the mast and hub. Alternatively, rotor blade pitch may be controlled by a servo flap, which is a small airfoil situated along a trailing edge of a portion of the blade, which is controllable by the pilot. Alternatively, the rotors may comprise an independent blade control (IBC) system (not shown), in which the swash plate assembly and control rods are replaced by a plurality of servo actuators (not shown), each servo actuator being coupled to a rotor blade so that the pitch of each blade could be controlled independently of the other blades. Rotors 32A, 32B may be mounted to fuselage 20, optionally via pylons 37A, 37B. Each rotor 32A and 32B may be canted outwards, away from the longitudinal axis of the CRA. As shown in FIG. 1, because of the outward canting of rotors 32A and 32B the top surface of blades 35A of left rotor 32A are visible (as indicated by a plain surface pattern), while the bottom surface of blades 35B of right rotor 32B are visible (as indicated by a shaded surface pattern).

In accordance with an embodiment of the disclosure, the rotors of the main rotor system and the proprotors of the TPAs are arranged such that, in helicopter mode, a portion of downward induced airflow, which may also be referred to as downwash, from the main rotors flows through at least a portion of the proprotor blades. Such an arrangement may be achieved by having a portion of a main rotor disc overhanging a portion of a TPA proprotor disc. A main rotor disc of left rotor 32A is schematically indicated with a circle 38A defined by a path travelled by tips of blades 35A during rotation. A main rotor disc for right rotor 32B is schematically indicated with circle 38B defined by a path travelled by tips of blades 35B. An overhang distance between rotor discs 38A, 38B and front proprotor 42 is schematically indicated with reference character "a", and an overhang distance between rotor discs 38A, 38B and back proprotor 52 is schematically indicated with reference character "b". The overhang arrangement of the TPA proprotor in relation to the main rotors may be referred to as a "rotor overhang" arrangement.

Under normal operation, the production of downwash by rotors (and proprotors) is coupled with the production of lift, which results from an imbalance in air pressure above and below the rotor blades where air pressure above the blades is lower than air pressure below the blades. However, downwash is not a purely downward flow of air, and certain flow patterns of the downwash can result in vortex ring state (VRS), as discussed further hereinbelow. A portion of the downwash spreads sideways due to centrifugal effect and resistance from static air pressure in the region beneath the rotor. Consequently, a portion of the downwash curls over the rotor blade into the region above the rotor blades, and reduces or eliminates air-pressure imbalance between the top and bottom sides of the rotor blades necessary for creating lift. The curling over of the downwash may occur around the blade tip or alternatively in the inner portion of the blade near the hub of the rotor, where the rotational velocity of the blade is relatively slow. When the curling up of the downwash above the blades is increased along the length of the blades from the blade tips and or the inner blade portions, the ability of the blades to produce lift is degraded, and the blades stall and fail to produce sufficient lift to counteract gravity's pull on the aircraft. Moreover, unlike during normal operation, increasing rotor rotation speed or blade pitch to increase downwash fails to restore the air-pressure imbalance and lift, because all or most of the increased downwash is redirected to increase air pressure above the blades. VRS is more likely to occur during quick descent and/or operation within a narrowly confined space, or near the ground, which are conditions conducive to having downwash curl over the blade and/or be directed to flow in a loop pattern from under the blades and over the blades. Helicopter rotors are typically configured to reduce occurrence of VRS, for example by being longer and more flexible compared to propellers for forward flight. In the presence of higher pressure under the blades, by way of example when the aircraft is descending, the flexible rotors curve up, increasing a horizontal, centrifugal component to the downwash and preventing the downwash from curling over the blades to invade the space above the blades. By comparison, proprotors, which are typically stiffer than helicopter rotors, are more susceptible to VRS. By having downwash from main rotors 32A, 32B flow through at least a portion of proprotor 42, 52, the main rotor downwash may advantageously reduce or weaken curling up of a proprotor's downwash, and thus reduce incidence of VRS. Without being bound by theory, VRS incidence may be reduced due to downwash from the main rotors cascading through the proprotor and thus enhancing downward flow of the proprotor's downwash. Alternatively or additionally, downwash from a main rotor may add a horizontal component to the air flow that is tangential to the rotation axis of the proprotor. The horizontal component of the main rotor downwash may increase curling radius of the proprotor's downwash that would be required to create VRS in the proprotor, thus reducing the incidence of VRS.

Main wings 60 and/or supplemental wings 70, in certain arrangements, may interfere with a portion of downwash produced by fore proprotor 42 and/or back proprotor 52 when in helicopter mode, thus weakening lift provided by the proprotors. In an embodiment of the disclosure, main wings 60 may be forward swept wings and/or supplemental wings 70 may be optionally back swept wings. See for example FIG. 2A. Where main wings 60 are configured in front of back proprotor 52, having main wings 60 be forward swept may reduce area of the main wings that interferes with downwash produced by back proprotor 52. Similarly, where supplemental wings 70 are configured behind fore proprotor 42, having the supplemental wings be back swept may reduce area of supplemental wing 70 that interferes with downwash by fore proprotor 52 by supplemental wings. In case the rear proprotor experiences VRS and the tail or the aircraft drops, thus increasing the CRA angle of attack, the ability of forward-swept wings to keep on flying with a high angle of attack may help to regain control over the CRA. Further, having main wings 60 be forward swept may provide an advantage of having the tips of the main wings be more easily visible for a pilot to visibly track the tips for avoiding nearby objects or the ground, especially but not limited to when the CRA is hovering in helicopter mode.

In an embodiment of the disclosure, forward swept main wings 60 and/or back swept supplemental wings 70 may be mounted so that they at least partially overlap with a perimeter of rotor discs 38A, 38B. Such a spatial arrangement forward swept main wings 60 and/or back swept supplemental wings 70 in relation to rotors 32A, 32B may advantageously reduce incidence of VRS, optionally by blocking a curling up of downwash created by rotors 32A, 32B.

During forward flight in helicopter mode, the speed of a retreating blade of a rotor relative to the air is slow compared to the speed of the progressing blade of the rotor relative to the air. Therefore, retreating blades of a rotor tend to produce less downwash, and thus less lift, than progressing blades, and the imbalance in lift between the retreating and progressing blades increase with airspeed. In an embodiment of the disclosure, main wings 60 and/or supplemental wings 70 may be mounted in relation to rotors 32A, 32B so that downwash from the rotors strike at least a portion of the main wings and/or supplemental wings. In such a configuration, because the downwash may partially reduce lift generated by the main and/or supplemental wings, a stronger lift generated by the progressing blade may be balanced by a correspondingly weaker lift produced on the corresponding side of the main and/or supplemental wings, and a weaker lift generated by the retreating blade may be balanced by a correspondingly strong lift produced on the corresponding side of the main and/or supplemental wings.

In an embodiment of the disclosure, forward swept main wings 60 and back swept supplemental wings 70 may be positioned such that they overlap completely or substantially within an interior portion of the rotor disc(s) of the main rotor(s) where downwash is relatively weak, and do not overlap or overlap with a relatively small portion of the outer perimeter of the rotor disc(s) where downwash is relatively strong. As a result, the degree to which blocking of downwash by the wings interfere with the ability of the main rotor(s) to produce lift is reduced.

FIGS. 1 and 2A illustrates a rotor overhang arrangement in CRA 10. Rotor hubs 34A, 34B are positioned above fore and rear proprotors 42, 52 and TPAs 40, 50 are arranged in sufficient proximity to main rotor system 30 along the CRA's longitudinal axis such that main rotor discs 38A, 38B overhang at least a portion of proprotors 42 and 52. The rotor overhang may be optionally in the perspective of an overhead view in a direction parallel to a vertical axis of CRA 10. Alternatively or additionally, where rotors are canted, as with rotors 32A, 32B, the rotor overhang may be in the perspective of a direction perpendicular to a plane defined by rotor disc 38A or 38B.

Typically, maximum speed of a CRA in airplane mode is substantially higher than maximum speed of a CRA in helicopter mode. As such, drag produced by a rotor, in particular the blades but also the shaft, hub and housing, can substantially degrade flight performance of the CRA in airplane mode. Alternatively or additionally, non-rotating and improperly positioned rotor blades may be exposed to damaging shear forces created by high velocity forward flight in airplane mode. Thus, it is advantageous to reduce the aerodynamic profile of the rotor and its components while the CRA is in airplane mode. In accordance with an embodiment of the disclosure, rotors of the main rotor system are pivotably mounted so that the rotors are operable to transition between a deployed state where the rotor is functional to provide lift to the CRA and a folded state where rotor blades are positioned along a body of the CRA, optionally fuselage and/or boom, to reduce drag and facilitate forward flight.

As shown in FIGS. 2A and 2B, each of rotors 32A, 32B is pivotably mounted to pylons 37A, 37B and is pivotable to transition between a deployed state in which the rotors are functional to rotate blades 35A, 35B to provide lift (FIG. 2A), and a folded state (FIG. 2B) in which the aerodynamic profile of the rotors are reduced.

In the deployed state (FIG. 2A), masts 33A, 33B are substantially vertical in a plane defined by the vertical and longitudinal axes ("pitch plane"), or alternatively tilted forward for example, 5 degrees forward from vertical along the pitch plane to provide forward thrust. Rotors 32A, 32B are canted away from the longitudinal axis of the CRA so that masts 33A, 33B are tilted outwards for example, 5 degrees from vertical in a roll plane. The canting away of rotors 32A, 32B enables blades 35A, 35B to clear the hub and mast of the opposing rotor.

In the folded state (FIG. 2B), rotors 32A, 32B are folded towards each other. Optionally, the rotors are "fully" folded to an extent that a side of each rotor housing 36A, 36B is flush against a surface of fuselage 20 and/or pylons 37A, 37B. Alternatively or additionally, fully folded rotors are folded to an extent that a longitudinal axis of masts 33A, 33B are oriented substantially parallel to a lateral axis of the CRA. As shown in FIGS. 2A, 2B, rotors 32A, 32B are configured to be pivotable about axes EA and EB, respectively, which may be substantially parallel to the longitudinal axis of the CRA. Rotors 32A, 32B are positioned with sufficient lateral distance from each other so that the rotors may be fully folded without having hubs 34A, 34B come into contact an thus interfere with the folding. Optionally, portions of fuselage 20 and/or pylons 37A, 37B designated for being flush against fully folded rotors may comprise an indentation 25 contoured to partially embed a rotor in order to improve the aerodynamic profile of the rotors in the folded state, and/or to enable a portion of a blade near its connection to a hub to be positioned closer to, optionally flush against, the fuselage. Optionally, pylons 37A, 37B may each comprise an aerodynamic enclosure 39A, 39B that encloses a portion of rotor housing 36A, 36B, respectively, to provide an aerodynamically advantageous profile.

In an embodiment of the disclosure, in the folded state, at least a portion of blades 35A, 35B are positioned along a body of the CRA, optionally fuselage 20, forward boom 22 and/or optionally tail boom 24. For the folded state, blades 35A, 35B may be positioned so that the longitudinal axis of each blade is substantially parallel to the longitudinal axis of the CRA. Aligning the longitudinal axes of each blade of a rotor to the longitudinal axis of the CRA may be achieved relatively simply if the rotor comprises two blades arranged in a linear configuration, as shown in the figures. Where a rotor comprises more than two blades, the blades may optionally be collapsed into a linear configuration through a fan-like or scissor-like mechanism, through the implementation of appropriately configured actuators.

Optionally, blades 35A, 35B of rotors 32A, 32B, respectively, may be rotated about its longitudinal axis so that at least a portion of a major surface of the rotor blades are substantially flush along a body of CRA 10, optionally fuselage 20 and/or fore boom 22, as well as optionally tail boom 24. In an embodiment of the disclosure, a servo actuator (not shown) coupled to a rotor blade 35A or 35B at or near the junction with rotor hub 34A or 34B, respectively, may be used to rotate the blade at a pitch angle suitable for resting the blade on the CRA body when in the folded state. Optionally, the servo actuator is part of an IBC system for controlling blade pitch during helicopter flight. Optionally, the blade pitch during helicopter flight is controlled by means of a swash plate and control rods, and the servo actuators are used to control blade pitch during transition of a rotor between the deployed state and the folded state. Optionally, the servo actuator may rotate a blade's pitch, by way of example about 90 degrees, when the rotor is being transitioned from the deployed state to the folded state. Typically, helicopter rotor blades are sufficiently flexible to be in a bowed state under its own weight when not being rotated. Optionally, portions of fore boom 22, fuselage 20, and/or tail boom 24 designated to be a blade resting surface may be contoured to match the contour of a major surface of a blade that rests on it. Alternatively, the blade-resting surface of fore boom 22, fuselage 20, and/or tail boom 24 may be substantially flat, with the resting rotor blades conforming to the flat surface when the rotors are in the folded state.

During fast forward flight when a CRA is in airplane mode, rotor blades may be exposed to various damaging forces induced by wind and vibrations even when the rotors are in a folded state as described hereinabove. In an embodiment of the disclosure, the CRA may comprise a blade holder operable to substantially immobilize a blade of a rotor in a folded state against the fuselage, forward boom and/or tail boom during airplane mode. As shown in FIG. 2B, fore boom 22 comprises blade holder 26 that is operable to close around a portion of blades 35A, 35B. Blade holder 26 optionally comprises an L-shaped structure that can be moved along the surface of fore boom 22 to cover an end portion of rotor blade 35A, 35B in a folded state. Alternatively or additionally, a blade holder in accordance with an embodiment of the disclosure may utilize an electromagnet (not shown) placed on underneath a surface of the fore boom designated to receive the rotor blade during a folded state. It may be especially advantageous to immobilize a rotor blade at or near an end portion pointed towards the front of CRA 10, as the front-pointing blade is more susceptible to damaging shear forces created by forward flight compared to a rear-pointing rotor blade.

It will be appreciated that the transitioning of the rotors from a deployed to a folded state as described hereinabove may be accomplished while advantageously maintaining the mechanical arrangement of rotor components, thus increasing structural strength, maintaining simplicity and robustness of the components, and reducing wear and tear that may arise from repeatedly transitioning the rotor between the two states. Each rotor 32A, 32B may be pivoted intact, without additional changes to the arrangement of its components. By way of example, the rotors may be pivoted without changing the arrangement of rotor mast 33A, 33B with respect to rotor hub 34A, 34B, respectively. In addition, while blade pitch is optionally adjusted, as described hereinabove, to have a major surface of the blade be flush against a fuselage and/or forward boom surface, some aerodynamic advantages of transitioning the rotors to a folded state may be provided without adjusting blade pitch in such a way.

The pivoting of rotors to transition between deployed and folded states may be coordinated by an automated flight control system ("AFCS"; not shown) to achieve advantageous flight properties.

As TPAs 40, 50 transition from helicopter mode to airplane mode, and forward flight speed increases, main and supplemental wings 60, 70 respectively, increasingly provide more lift, until a minimum airspeed ("wing-lift speed") at which the wings provide sufficient lift for maintaining altitude without direct contribution of lift from main rotor system 30 and optionally TPAs 40, 50 is achieved. AFCS may be configured to initiate folding of rotors 32A, 32B from the deployed state to the folded state after CRA 10 achieves wing-lift speed. The wing-lift speed may be responsive to load carried by CRA 10, in that a heavier load increases the wing-lift speed.

Once the rotor folding procedure is initiated, transmission of power from a rotor engine (not shown) configured to rotate rotor masts 33A, 33B is reduced and terminated. In a synchropter, both rotors 32A, 32B are typically powered by the rotor engine (now shown), which may be mounted onto or located within fuselage 20, with rotational force from the engine being transmitted to both rotor masts 33A, 33B through a transmission system (not shown). The transmission system may optionally be geared to maintain a given rotational offset between masts 33A, 33B so that blades 35A, 35B can intermesh with striking each other during helicopter flight. During the folding procedure, the transmission may be adjusted to eliminate the rotational offset between blades 35A, 35B so that the longitudinal axes of the rotor blades can be oriented to be substantially parallel to the longitudinal axis of CRA 10 (as shown in FIG. 2A). Optionally, masts 33A, 33B may be disengaged from the transmission, and separate rotational actuators (not shown) comprised in each of rotors 32A, 32B may orient the blades along the CRA's longitudinal axis. After the blades are aligned to the CRA's longitudinal axis, appropriate folding actuators may pivot rotors 32A, 32B about axes EA, EB, respectively, so that the rotors transition to the folded state. Optionally, prior to or during the pivoting of rotors 32A, 32B, the pitch of blades 35A, 35B is adjusted so that a major surface of the blades is oriented to rest on fuselage 20, fore boom 22 and optionally tail boom 24. It will be appreciated that if rotors 32A, 32B are pivoted simultaneously and in a coordinated matter, there will be substantially no change in the center of mass of CRA 10 along its lateral and longitudinal axes, thus advantageously maintaining stability of flight during the rotor folding procedure.

Whereas folding main rotors 32A, 32B as described hereinabove and as shown in FIGS. 1 and 2A-2B are mounted to CRA 10 having TPAs 40, 50, the folding main rotors may be mounted on aircraft having other configurations. Optionally, the folding main rotors may be mounted on aircraft having conventional propeller or jet propulsion systems to provide thrust for forward flight, and main rotors 32A, 3B in a deployed stated may be sufficient for providing hovering and VTOL capabilities to the aircraft without additional lift provided by TPAs.

Figure 3A:
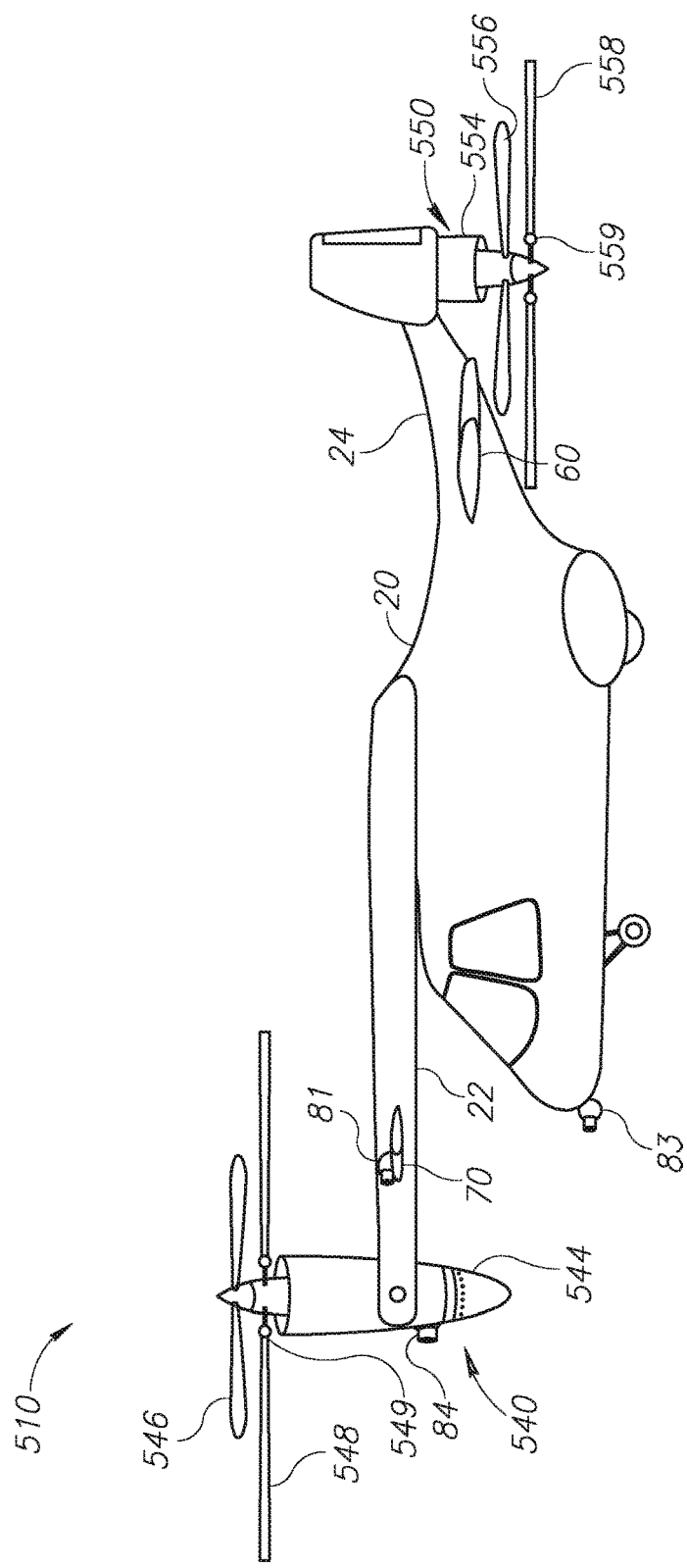
FIG. 3A shows a schematic illustration of an alternative CRA comprising DMTPA in helicopter mode in accordance with an embodiment of the disclosure.
Figure 3B:
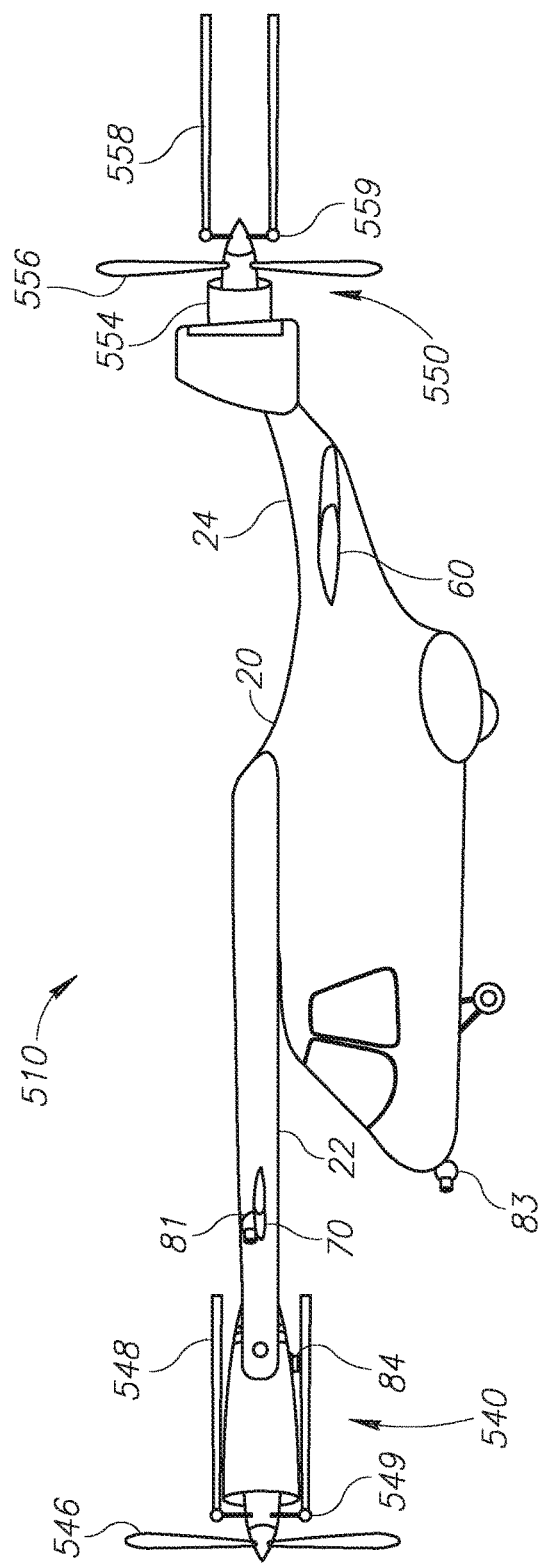
FIG. 3B shows a schematic illustration of the alternative CRA comprising DMTPA in airplane mode in accordance with an embodiment of the disclosure.

Reference is now made to FIGS. 3A-3B. In accordance with an embodiment of the disclosure, a CRA may comprise at least one DMTPA comprising an upstream proprotor and a downstream proprotor in a coaxial configuration. The downstream proprotor may be configured to be more advantageous, relatively to the upstream proprotor, to function as a rotor to provide lift for hovering and/or VTOL, and the upstream proprotor may be configured to be more advantageous, relative to the downstream proprotor, to function as a propeller to provide thrust for forward flight. Blades of the downstream proprotor are characterized relative to blades of the upstream proprotor by one or a combination of two or more characteristics selected from: a longer length, a higher structural flexibility, and a thinner profile.

In accordance with an embodiment of the disclosure, rotation of the downstream and upstream proprotors may be controlled independently, so that the two coaxial proprotors may rotate at different speeds, or one proprotor may be rotating while the other proprotor is not rotating. The two proprotors are optionally equi-rotating or counter-rotating.

An AFCS may be operable to control rotation of each of the coaxial proprotors for advantageously transitioning between helicopter and airplane mode. Optionally, when a DMTPA is pivoted in a vertical orientation for helicopter mode, both upstream and downstream proprotors are rotated to provide lift. Alternatively, only the downstream proprotor, which is advantageously configured for helicopter flight, is made to rotate during helicopter mode while the upstream proprotor, which is advantageously configured for forward flight, is left unused. Optionally, when the DMTPA is pivoted in a horizontal orientation for airplane mode, both upstream and downstream proprotors are rotated to provide forward thrust. Alternatively, only the upstream proprotor is rotated in airplane mode while the downstream proprotor is unused. During a transition from one flight mode to another, one proprotor may gradually increase its rotation speed while the other proprotor decreases its rotation speed. By way of example, while a DMTPA is pivoting to transition from helicopter mode to airplane mode, a downstream proprotor which was providing lift during helicopter may gradually slow down, then optionally stop rotation. Concurrently, an upstream proprotor may begin rotating and/or gradually increase rotation speed.

During helicopter mode, the upstream proprotor, which is configured to be more advantageous than the downstream proprotor to function as a propeller, is more susceptible to VRS compared to the downstream proprotor. In an embodiment of the disclosure, the AFCS may only rotate the downstream proprotor, which is less susceptible to VRS than the upstream proprotor, during helicopter mode. Alternatively or additionally, the AFCS may reduce the angle of attack of the upstream proprotor's blades, by way of example to zero degrees relative to a proprotor disc, so that the downstream proprotor is primarily, or solely, utilized to produce lift.

During airplane mode, blades of a downstream proprotor can increase drag and reduce efficiency of forward flight. In accordance with an embodiment of the disclosure, blades of the unused downstream proprotor may be foldable towards a downstream direction, transitioning from a deployed state into a folded state, in order to advantageously provide a reduced aerodynamic profile of the downstream proprotor during forward flight. Optionally, the DMTPA comprises actuators and controllers as appropriate, optionally coordinated by an AFCS as described herein, for transitioning the downstream proprotor between a folded state and a deployed state.

FIGS. 3A-3B schematically show an alternative CRA 510 that is substantially the same as CRA 10 schematically shown in FIGS. 1 and 2A-2B, with the exception that CRA 510 does not comprise main rotor system 30 and comprises two DMTPAs, a fore DMTPA 540 comprising an upstream proprotor 546 and a downstream proprotor 548, and a rear DMTPA 550 comprising an upstream proprotor 556 and a downstream proprotor 558. FIG. 3A shows CRA 510 is in helicopter mode with DMTPAs 540, 550 in a vertical orientation, and FIG. 3B shows CRA 510 in airplane mode with DMTPAs 540, 550 in a horizontal orientation. Further, downstream proprotors 548, 558 are in a deployed state as shown in FIG. 3A and in a folded state as shown in FIG. 3B. In an embodiment of the disclosure, downstream proprotors 548, 558 are foldable along hinges 549, 559, respectively. Hinges 549, 559 comprise rotational actuators (not shown) and/or locking mechanisms (not shown) that fold the downstream proprotors into the folded state when unused during airplane mode, and open the downstream proprotors into the deployed state when transitioning into helicopter mode. Optionally, when transitioning from the deployed state to the folded state, the proprotors uses airflow produced by horizontal flight to provide power for folding the blades. Optionally, the proprotors may be rotated to provide centrifugal force for opening the blades when transitioning from the folded state to the deployed state. Optionally, hinges 549, 559 further comprise IBC servo actuators (not shown) for controlling blade pitch during helicopter flight mode.

Figure 3C:
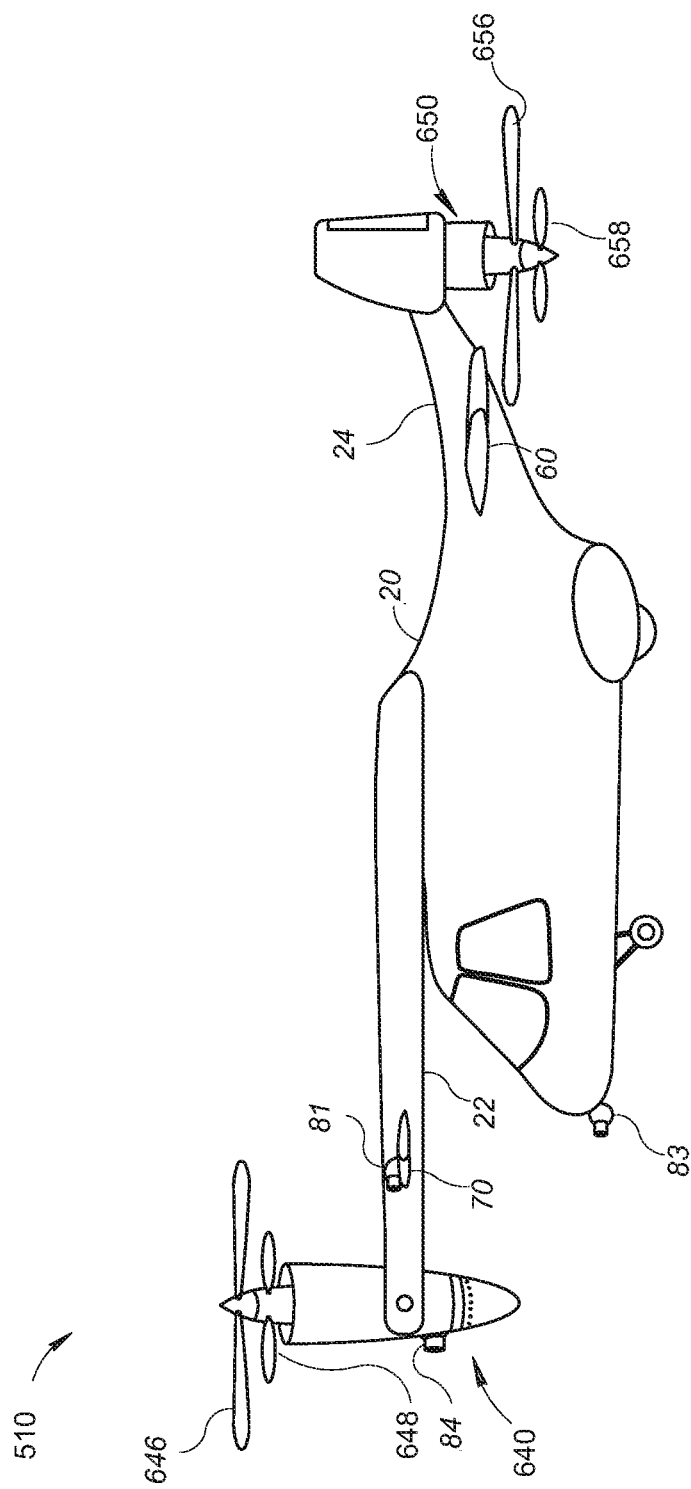
FIG. 3C shows a schematic illustration of an alternative CRA comprising an alternative DMTPA in helicopter mode in accordance with an embodiment of the disclosure.

FIG. 3C shows CRA 510 comprising alternative DMTPAs 640 and 650 in helicopter mode. DMTPA 640 comprises a main proprotor 646 and a support proprotor 648 having a shorter blade length relative to the main proprotor Similarly, DMTPA 650 comprises a main proprotor 656 and a support proprotor 658 having a shorter blade length relative to the main proprotor. Optionally, the blades of support proprotor 658 are less than 50%, less than 40%, less than 30%, less than 25%, or less than 20%, of the length of the blades of main proprotor 656. As explained hereinabove, VRS may occur when downwash created by a proprotor curls up and creates an upward flow of air through an inner portion of the blade near the hub of the rotor, where the rotational velocity of the blade is slow relative to the outer portion of the blade. In an embodiment of the disclosure, support proprotor 658 serves to provide supplementary downwash that serves to lessen or prevent the upward flow of air through the inner potions of the main proprotor blades near the hub, thus lessening or preventing the occurrence of VRS in the main proprotor. In an embodiment of the disclosure, the support proprotor may be operable to rotate at a higher rotational velocity than the main proprotor, optionally at about 2 to 3 times the rotational velocity of the main proprotor. Whereas support proprotors 648, 658 are shown in FIG. 3C to be situated downstream of main proprotors 646, 656, respectively, a supports proprotor may optionally be situated upstream of the main proprotor.

Whereas DMTPAs as described hereinabove and as shown in FIGS. 3A-3C are mounted to CRA 510 that lacks main rotors 32A and 32B, and are arranged along a longitudinal axis of the CRA, DMTPAs may be mounted on CRAs having other configurations. Optionally, DMTPAs may be mounted on a CRA having a main rotor system (for example main rotor system 30 as shown in a described with respect to FIGS. 1, 2A and 2B). Additionally or alternatively, DMTPAs may be arranged along a lateral axis of the CRA rather than a longitudinal axis.

Figure 4A:
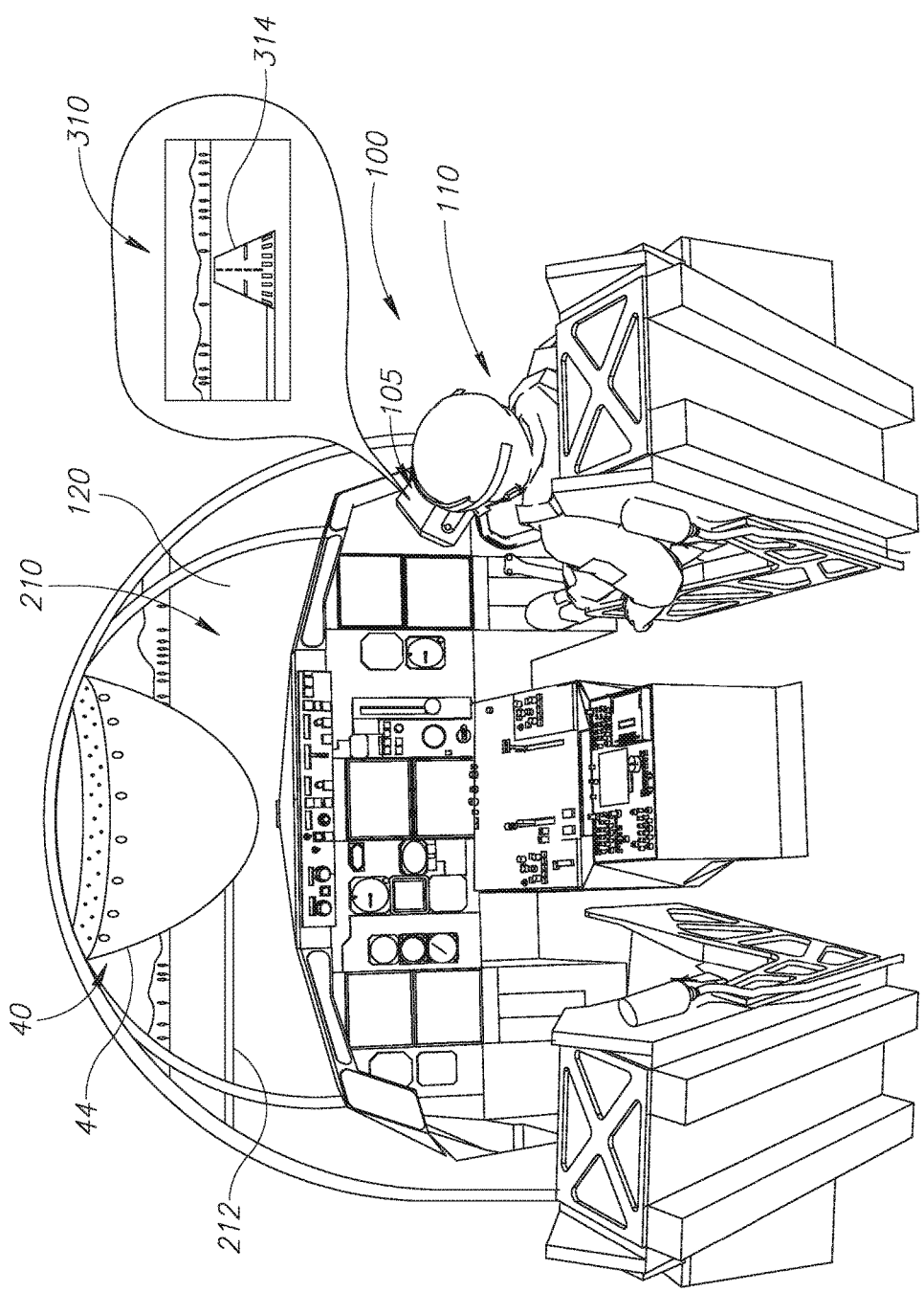
FIG. 4A shows a schematic illustration of a cockpit of a CRA in helicopter mode with a pilot wearing a helmet comprising a HMD displaying a view captured by one or more external cameras in accordance with an embodiment of the disclosure.
Figure 4B:
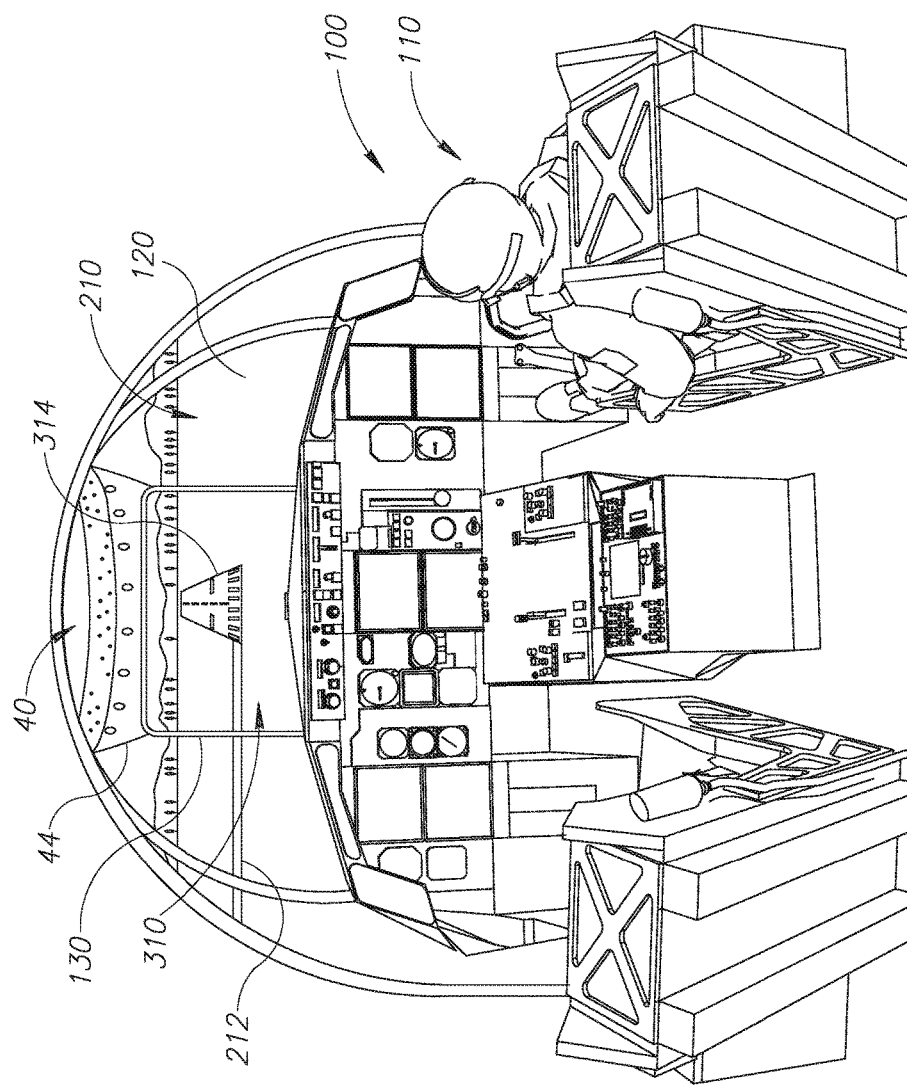
FIG. 4B shows a schematic illustration of a cockpit of a CRA in helicopter mode, the cockpit comprising a monitor displaying a view captured by one or more external cameras in accordance with an embodiment of the disclosure.

Reference is now made to FIGS. 4A and 4B. Because of the in-line configuration of TPAs, a fore TPA, and optionally a forward boom that supports the fore TPA may obscure front-facing field of view (FOV) out of a cockpit of a CRA. FIGS. 4A and 4B illustrate a cockpit 100 of CRA 10 that is flying in helicopter mode. When TPA 40 is oriented upwards for helicopter mode, REP 44 obscures a FOV 210 through cockpit window 120 that is provided to pilot 110. By way of example, while a portion of a road 212 is visible to the pilot, a portion of FOV 210 is directly in front of CRA 10 is obscured by REP 44.

In accordance with an embodiment of the disclosure, CRA 10 is fitted with one or more of forward looking cameras, by way of example cameras 81-84 (shown in FIGS. 1, 2A-2B, 3A-3C) that acquire images of a scene facing the CRA. The one or more cameras may be mounted on a wing (by way of example cameras 81 and 82 mounted on supplemental wings 70) and/or a fuselage (by way of example camera 83 mounted on a front portion of fuselage 20). In an accordance with an embodiment of the disclosure, camera 84 is mounted on front REP 44 so that camera 84 points forward when REP 44 is in helicopter mode and points down when REP 44 is in airplane mode (as shown in FIG. 2B). The cameras provide the images to a HMD 105 worn by pilot 110 (FIG. 3A) or to a video screen 130 in cockpit 100 (FIG. 3B) to provide the pilot with a un-obscured forward FOV 310 from the aircraft. By way of example, runway 314, which is completely obscured by REP 44 in FOV 210 out of cockpit window 120 is visible in FOV 310 as viewed through HMD 105 (FIG. 3A) or video screen 130 (FIG. 3B). Optionally, video screen 130 is retractably positioned over a portion of window 120 overlapping a portion of FOV 210 that is obscured by REP 44.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to persons of the art. The scope of the disclosure is limited only by the claims.

The invention claimed is:

1. A convertible rotor aircraft (CRA) able to convert between airplane and helicopter flight modes during flight, comprising:
   a rotor system for providing lift during helicopter mode comprising two intermeshing rotors in a synchropter arrangement on opposite sides of a longitudinal axis of the CRA, each rotor being pivotable around an axis that is substantially parallel to a longitudinal axis of the CRA and into a folded state.

2. A convertible rotor aircraft able to convert between airplane and helicopter flight modes during flight, comprising:
   at least one rotor comprising at least one rotor blade that is rotatable to provide lift to an aircraft, wherein:
   the at least one rotor is pivotable around an axis that is substantially parallel to a longitudinal axis of the aircraft to transition between a folded state in which the at least one rotor blade of the at least one rotor lies substantially along the longitudinal axis of the aircraft and a deployed state in which the at least one blade is rotatable to provide lift to the aircraft; and
   the at least one rotor is controlled to be in the folded state during the airplane flight mode and the deployed state during the helicopter flight mode.

3. The convertible rotor aircraft according to claim 2, wherein the at least one rotor comprises two rotors.

4. The convertible rotor aircraft according to claim 3, wherein the two rotors are located on opposite sides of the longitudinal axis of the aircraft.

5. The convertible rotor aircraft according to claim 4, wherein the two rotors are configured as intermeshing rotors in a synchropter arrangement.

6. The convertible rotor aircraft according to claim 2, wherein in the folded state, the rotor is positioned to be apposed to a surface of a body of the aircraft.

7. The convertible rotor aircraft according to claim 2, wherein in the folded state, the rotor is positioned so that a longitudinal axis of a mast of the rotor is substantially parallel to a lateral axis of the aircraft.

8. The convertible rotor aircraft according to claim 2, wherein, in the folded state, the rotor is positioned so that at least a portion of a major surface of the at least one blade of each rotor is substantially flush against a portion of the aircraft body.

9. The convertible rotor aircraft according to claim 2, wherein an arrangement of a rotor hub to a respective rotor mast in unchanged between the folded state and the deployed state.

10. The convertible rotor aircraft in accordance with claim 2, comprising at least one tiltable proprotor assembly comprising a proprotor that is tiltable to change the axis of rotation of the proprotor between a substantially horizontal orientation to provide forward thrust and a substantially vertical orientation to provide lift.

11. The convertible rotor aircraft in accordance with claim 2, comprising a propeller system to provide forward thrust.

12. The convertible rotor aircraft in accordance with claim 2, comprising a jet propulsion system to provide forward thrust.

13. The convertible rotor aircraft in accordance with claim 2 comprising a blade holder operable to substantially immobilize the at least one blade when the rotor is in a folded state.

14. The convertible rotor aircraft in accordance with claim 13, wherein the blade holder comprises a structure operable to close around a portion of the at least one blade.

15. The convertible rotor aircraft in accordance with claim 13, wherein the blade holder comprises an electromagnet placed underneath a surface of the aircraft body designated to receive the at least one blade.

16. A rotor system for providing lift to an aircraft, the rotor system comprising:
   two rotors on opposite sides of a longitudinal axis of the aircraft, each rotor comprising at least one rotor blade, wherein each rotor of the two rotors are respectively pivotable around an axis that is substantially parallel to a longitudinal axis of the aircraft so that the two rotors can transition between a folded state in which the at least one rotor blade of each rotor respectively lies substantially parallel to the longitudinal axis and a deployed state in which the two rotors are configured as intermeshing rotors in a synchropter arrangement and the at least one blade of each of the two rotors are rotatable to provide lift to the aircraft.

* * * * *